July 17, 1951
J. A. SMIT
2,561,238
EMERGENCY MEANS FOR SUPPLYING FUEL
TO INTERNAL-COMBUSTION ENGINES
Filed Feb. 5, 1948
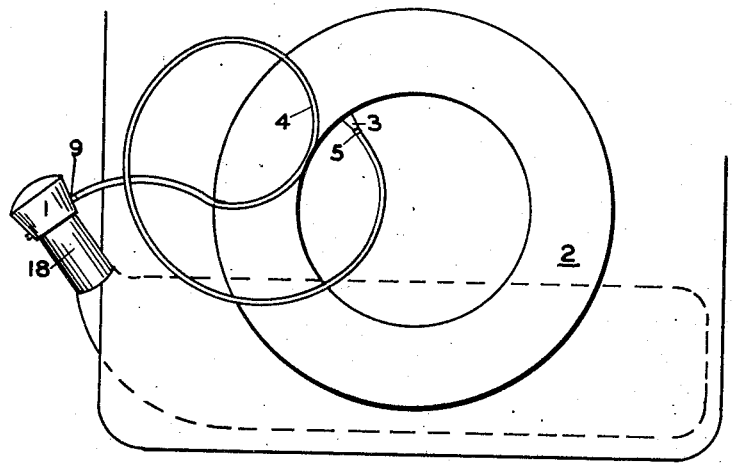
Fig. I
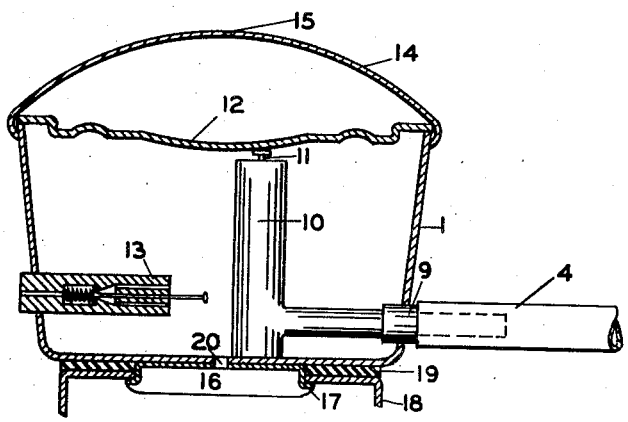
Fig. II
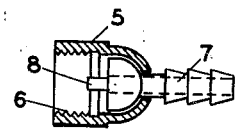
Fig. III
INVENTOR.
JACOBUS A. SMIT
BY
Francis E. Boyer
ATTORNEY Patented July 17, 1951

2,561,238

UNITED STATES PATENT OFFICE 2,561,238

EMERGENCY MEANS FOR SUPPLYING FUEL TO INTERNAL-COMBUSTION ENGINES

Jacobus Albertus Smit, Cassel Dale, Springs, Transvaal, Union of South Africa

Application February 5, 1948, Serial No. 6,473
In the Union of South Africa November 3, 1947

Section 1, Public Law 690, August 8, 1946
Patent expires November 3, 1967

3 Claims. (Cl. 158—36.5)

1

This invention relates to means which, in cases of emergency, are used to supply fuel to internal combustion engines, and are especially of service for use in motor cars.

Owing to the breakdown of fuel pumps or due to vapour locks in fuel pipe lines a stoppage in the supply of fuel to internal combustion engines is encountered.

The object of this invention is to provide emergency means whereby air pressure is supplied to the fuel tank to force the fuel to the engine.

A further object is to apply to a fuel tank regulating means whereby air at suitable pressure may be supplied to the fuel tank to press the fuel out of the same.

A further object is to provide means whereby the air pressure in the tube of a spare wheel of a motor car is used to supply air pressure to the fuel tank of a motor car to force fuel from the tank to the engine.

A preferred form of the invention is illustrated in the accompanying drawings, in which:

Fig. I shows, somewhat diagrammatically, the rear of a motor car with a special cap for the fuel tank and a connection to the spare wheel.

Fig. II is an elevation of the special tank cap partly in section.

Fig. III is a detail.

In the drawings 1 is a hollow cap, 2 the spare wheel and 3 its air valve. 4 is a tube preferably of rubber or like resilient material. One end of the tube 4 is attached to the air valve 3 of the tube of the spare wheel 2 by a connection 5 which has an internally screwed socket 6 to fit the valve 3 and having a projecting spigot 7 to which the end of tube 4 is attached. In socket 6 is a projection 8 to press down and open the air valve 3 in the well known manner. (See Fig. III.)

Having fixed the socket 6 to valve 3 the air passes through the tube 4 to the cap 1 to which the other end of tube 4 is attached. A pipe 9 projects outwardly from the cap 1 to form a spigot for attaching tube 4 and inwardly it is connected to a vertical tube 10 containing an air valve similar to a tire tube valve but with the valve spindle 11 projecting above the tube 10. 12 is a diaphragm dished so that its centre may be buckled axially under pressure but which will spring back to its original form, shown in the drawings, when the pressure is relieved. Said diaphragm 12 is fixed to the top edge of the cap 1 so that it rests upon and depresses the spindle 11. 13 is a spring loaded safety valve adapted to open when the pressure in cap 1 reaches a predetermined point.

14 is a dome fixed in place to protect the diaphragm 12. It is ventilated by aperture 15.

16 is a socket with ears 17 adapted to clip into the end of the normal fuel filling pipe 18 so that cap 1 may take the place of the usual cap for the fuel tank. 19 is a gasket to make an air tight joint between the bottom of cap 1 and the top of the pipe 18. 20 is an orifice communicating with the interior of cap 1.

In applying this invention to a motor car it is assumed that the motorist finds that he is not getting his fuel delivered to his engine owing to the breakdown of his fuel pump or vapour or air locks in his fuel pipe. He removes his fuel tank cap and attaches cap 1 in its place.

The rubber tube 4 is attached, one end to pipe 9 and the other, furnished with socket 6, is attached to the air valve 3 of the tube of the tire of the spare wheel 2. The projection 8 of socket 7 opens the valve 3 and air passes by tube 4 into cap 1 and thence by orifice 20 into the fuel tank, since initially the projection 11 of the valve in tube 10 is depressed by the diaphragm 12. When the air has reached the desired pressure, say 2 lbs. p. s. i., diaphragm 12 is pressed upwards and away from projection 11. This allows the valve in tube 10 to close and the air flow into cap 1, and therefore through orifice 20 into the fuel tank, is checked. When, however, sufficient air is used in pressing out the fuel from the fuel tank to relieve the pressure on diaphragm 12 said diaphragm is allowed to spring back to its normal position to depress the projection 11 and therefore allow the valve in tube 10 to open and a further supply of air to enter cap 1 and discharge through aperture 20.

The air pressure thus supplied is sufficient to force the fuel to the engine but if, through unforseen circumstances, the air pressure accumulates in cap 1 the valve 13 acts as a safety valve to prevent excessive pressure being built up.

This invention provides an emergency means for passing fuel to an internal combustion engine and is particularly useful applied to motor vehicles when fuel supply conditions are abnormal.

What I claim as new and desire to secure by Letters Patent is:

1. An emergency cap for the fuel tanks of motor vehicles, comprising a closed vessel having an air inlet and means for connecting said inlet to a source of air under pressure, a resilient pressure-responsive diaphragm forming one wall of said vessel, a normally closed valve disposed in said air inlet, a stem carried by said valve in contact with said diaphragm thereby to maintain the valve open, said diaphragm being operable by pressure of air admitted through said inlet to move the diaphragm away from said valve stem thereby to permit the valve to close when a predetermined pressure is reached in the vessel, said vessel having an air outlet opening, and airtight means for connecting said opening to the fuel tank of a motor vehicle.

2. An emergency cap for the fuel tanks of motor vehicles as set forth in claim 1, and including a safety valve communicating with the interior of said vessel.

3. An emergency cap for the fuel tanks of motor vehicles as set forth in claim 1, and including a perforated cap disposed on the vessel over said diaphragm and a safety valve in communication with the interior of said vessel.

JACOBUS ALBERTUS SMIT.

REFERENCES CITED

The following references are of record in the file of this patent:

UNITED STATES PATENTS

| Number | Name | Date |
| --- | --- | --- |
| 344,654 | Harris et al. | June 29, 1886 |
| 694,305 | Branch | Feb. 25, 1902 |
| 1,096,901 | Freshel et al. | May 19, 1914 |
| 1,341,393 | Stokes et al. | May 25, 1920 |
| 1,361,418 | Tolchan | Dec. 7, 1920 |
| 1,399,013 | Fleener | Dec. 6, 1921 |
| 1,490,802 | Davis | Apr. 15, 1924 |
| 1,498,709 | Wilson | June 24, 1924 |
| 2,237,559 | Jenne | Apr. 8, 1941 |